(12) United States Patent
Andersen et al.

(10) Patent No.: US 9,550,521 B2
(45) Date of Patent: Jan. 24, 2017

(54) HYDRAULIC STEERING ARRANGEMENT

(71) Applicant: Sauer-Danfoss ApS, Nordborg (DK)

(72) Inventors: Rene Andersen, Sydals (DK); Niels Arbjerg, Sydals (DK); Abdul Karim Rahimzai, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 315 days.

(21) Appl. No.: 14/203,615

(22) Filed: Mar. 11, 2014

(65) Prior Publication Data

US 2014/0298792 A1 Oct. 9, 2014

(30) Foreign Application Priority Data

Apr. 5, 2013 (EP) .................................... 13001760

(51) Int. Cl.
    *B62D 5/065* (2006.01)
    *B62D 5/06* (2006.01)
    *B62D 5/093* (2006.01)

(52) U.S. Cl.
    CPC .............. *B62D 5/062* (2013.01); *B62D 5/093* (2013.01); *B62D 5/065* (2013.01)

(58) Field of Classification Search
    CPC ..... B62D 5/065; B62D 5/075; F15B 2211/781
    See application file for complete search history.

(56) References Cited

U.S. PATENT DOCUMENTS

| | | | | | |
|---|---|---|---|---|---|
| 5,184,693 | A | * | 2/1993 | Miller | ............. B62D 5/06 180/423 |
| 7,631,590 | B2 | * | 12/2009 | Thomsen | ............ B62D 5/065 60/384 |

FOREIGN PATENT DOCUMENTS

| | | |
|---|---|---|
| CN | 1638996 A | 7/2005 |
| CN | 102991571 A | 3/2013 |
| DE | 10 2008 026 192 A1 | 12/2008 |
| EP | 0 356 408 A2 | 2/1990 |
| WO | 01/47763 A1 | 7/2001 |

OTHER PUBLICATIONS

European Search Report for Serial No. EP 13 00 1760 dated Sep. 10, 2013.

* cited by examiner

*Primary Examiner* — F. Daniel Lopez
(74) *Attorney, Agent, or Firm* — McCormick, Paulding & Huber LLP

(57) ABSTRACT

A hydraulic steering arrangement (1) is provided comprising a static steering unit (2) and an adjustable pressure source (3) connected to a pressure port (4) of said steering unit (2) and having a load sensing port (21). Such a steering unit should enable a fast reaction of the steering unit. To this end said pressure source (3) is a dynamic pressure source having an orifice (Adyn) outputting hydraulic fluid to said load sensing port (21), a load sensing line (22) connecting said load sensing port (21) and a low pressure port (11), a control valve (24) being arranged in said load sensing line (22) between said load sensing port (21) and said low pressure port (11), said control valve (24) being actuated by a control pressure within said steering unit (2) and throttling a flow through said load sensing line (22) depending on said control pressure.

17 Claims, 1 Drawing Sheet

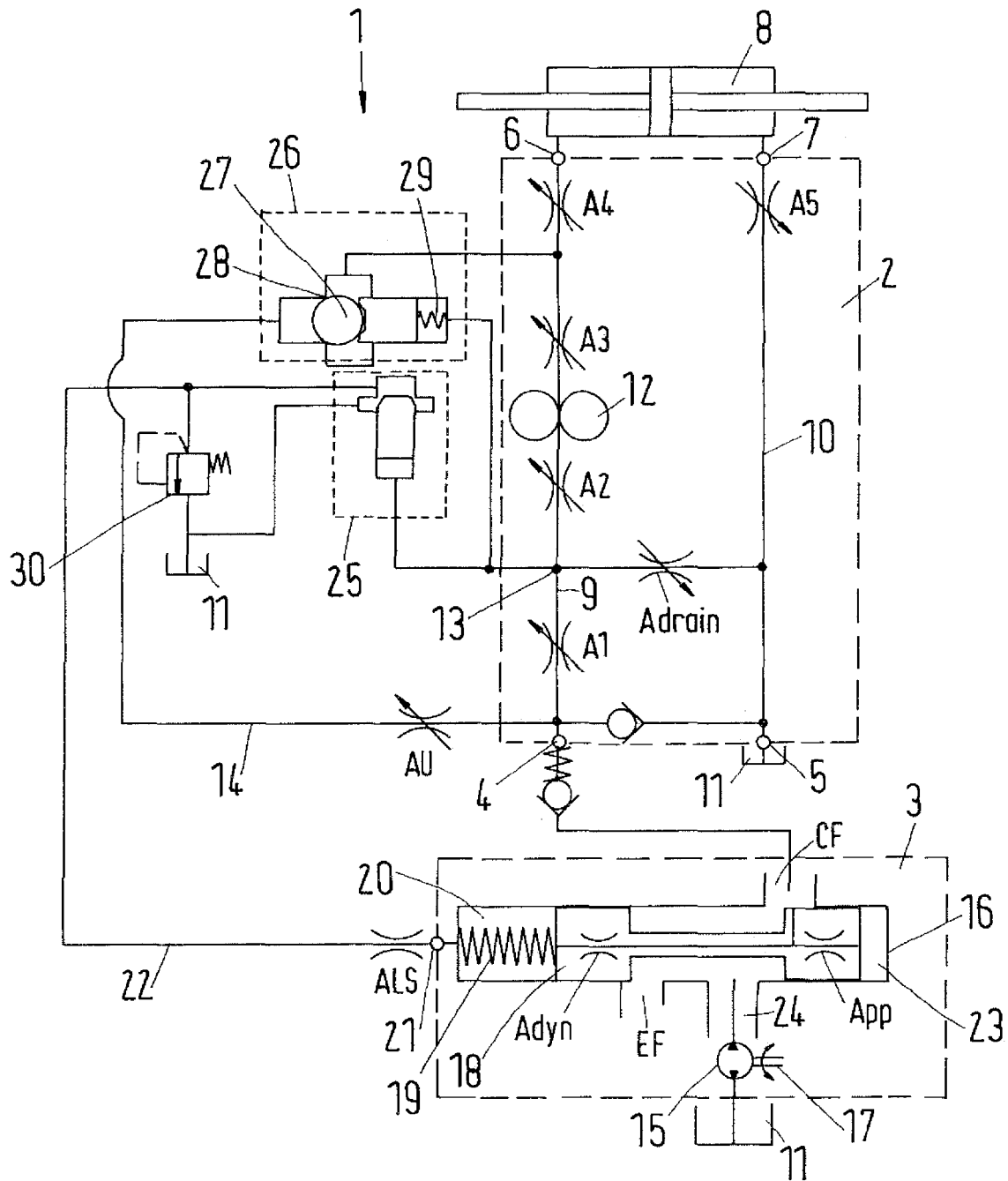

HYDRAULIC STEERING ARRANGEMENT

CROSS REFERENCE TO RELATED APPLICATIONS

Applicant hereby claims foreign priority benefits under U.S.C. §119 from European Patent Application No. EP13001760.01 filed on Apr. 5, 2013, the contents of which are incorporated by reference herein.

TECHNICAL FIELD

The present invention relates a hydraulic steering arrangement comprising a static steering unit and an adjustable pressure source connected to a pressure port of said steering unit and having a load sensing port.

BACKGROUND

Such a steering arrangement is usually used to steer a vehicle. The steering unit is connected to a steering wheel or another steering command generator. When the steering wheel is turned, it is intended to turn the steered wheels as well.

In order to save energy, a steering unit is often connected to an adjustable pressure source. The output pressure of this pressure source is adapted to the required pressure, i.e. the pressure is increased only when there is a demand. Such a demand arises when the driver intends to steer the vehicle. When there is no steering requirement, the pressure of the pressure source is lowered.

In a static steering unit the pressure demand is signaled to the adjustable pressure source with a certain delay after the start of the turning of the steering wheel. This has the negative effect that the steering of the steered wheels is delayed.

SUMMARY

The object underlying the present invention is to enable a fast reaction of a steering unit working according to the static principle.

According to the present invention, this object is solved in that said pressure source is a dynamic pressure source having an orifice outputting hydraulic fluid to said load sensing port, a load sensing line connecting said load sensing port and a low pressure port, a control valve being arranged in said load sensing line between said load sensing port and said low pressure port, said control valve being actuated by a control pressure within said steering unit and throttling a flow through said load sensing line depending on said control pressure.

Such a system allows the combination of a static steering unit and of a dynamic pressure source with the effect that the static steering unit can react with a substantially smaller delay than without said dynamic pressure source. The pressure at the load sensing port is determined basically on the flow of fluid outputted by the pressure source. When the control valve is open, there is no or almost no pressure drop at the control valve. This is the situation when the control pressure within said steering unit is low so that the control valve is not shifted in a throttling position. However, if the steering wheel (the term "steering wheel" is in the following used as abbreviation for any steering command means) is actuated, the pressure within the steering unit increases and consequently the control pressure within the steering unit increases accordingly. This has the effect that the control valve increases a flow resistance within the load sensing line which in turn increases a pressure drop over the control valve. Accordingly, the pressure at the load sensing port of the pressure source increases and the pressure of the pressure source increases as well. This increase of the output pressure can occur rather fast so the reaction time of the steering unit can be kept short.

Preferably, said steering unit comprises a supply port arrangement having a pressure port and a return port, a working port arrangement having two working ports, a main flow path between said pressure port and a said working port arrangement, a return flow path between said working port arrangement and said return path, a main orifice and a flow meter being arranged in said main flow path, said main orifice opening upon actuation of a steering wheel, said control pressure being a pressure downstream said main orifice.

When the main orifice opens as a result of the actuation of the steering wheel, a pressure downstream said main orifice increases since a connection between a point downstream the main orifice and the pressure port of the steering unit is established. Therefore, the control pressure can act on the control valve throttling the flow through the load sensing line and consequently signaling a pressure demand to the dynamic pressure source.

Preferably, said control pressure is a pressure between said main orifice and said flow meter. This pressure is one of the most significant pressures within the steering unit indicating the pressure demand. Therefore, this pressure can preferably be used as control pressure.

In a preferred embodiment said control valve has a control pressure/flow resistance function corresponding to the load sensing pressure/output function of said pressure source. In this way it is possible to obtain a rather smooth feedback control of the dynamic pressure source. The risk of pressure variations at the pressure port of the steering unit can be avoided.

In a preferred embodiment said pressure source comprises a dynamic priority valve. In other words, a pressure source can be used having a fixed displacement pump. The output pressure of the pressure source is adjusted by adjusting the priority valve. The priority valve has an orifice supplying hydraulic fluid from the priority valve input to the load sensing port.

Preferably, an amplification flow path is arranged in parallel to a section of said main flow path, said section comprising said main orifice and said flow meter. In other words, said amplification flow path bridges said flow meter. An adjustable orifice is arranged within said amplification flow path, said adjustable orifice being controlled similar to the main orifice in the main flow path. In this way it is possible to control part of the fluid from the steering unit pressure port to the working port arrangement by means of the flow meter and guiding the proportional part of hydraulic fluid from the steering unit pressure port to the working port arrangement via the amplification flow path. This has the advantage that the flow meter can be kept small.

In such a steering arrangement it is of advantage that a safety valve is arranged in said amplification flow path, said safety valve being loaded in closing direction by said control pressure. The safety valve is used to close or block the amplification flow path in case the main flow path is blocked or closed as well. Such a blocking can occur when the flow meter is jammed by dirt or the like or when orifices in the section of the main flow path are blocked by dirt or the like.

BRIEF DESCRIPTION OF THE DRAWING

A preferred example of the invention will now be described in more detail with reference to the drawing, wherein the only FIGURE is a schematic illustration of a hydraulic steering arrangement.

DETAILED DESCRIPTION

A hydraulic steering arrangement 1 comprises a static steering unit 2 and an adjustable pressure source 3. The adjustable pressure source 3 is connected to a pressure port 4 of said steering unit 2. The steering unit 2 furthermore comprises a return port 5. The pressure port 4 and the return port 5 together form a supply port arrangement. Furthermore, the steering unit 2 comprises a working port arrangement comprising two working ports 6, 7, said working ports 6, 7 are connected in the present embodiment to a steering motor 8.

As it is known in the art, said steering unit 2 comprises a main flow path 9, arranged between said pressure port 4 and said working port arrangement 6, 7. It depends on the direction of steering, which of the two working ports 6, 7 is connected to the main flow path 9. The other of the two working ports 6, 7 is connected to the return port 5 by means of a return path 10. The return port 5 is connected to a tank 11.

As it is known in the art, the steering unit comprises a number of variable orifices, commonly referred to as A1, A2, A3, A4, A5, wherein a main orifice A1 basically determines the flow through the main flow path 9. Furthermore, a flow meter 12 is arranged within said main flow path 9 metering the amount of hydraulic fluid coming from the pressure port 4 to the working port arrangement 6, 7.

A point 13 downstream the main orifice A1 and upstream a flow meter orifice A2 is connected to the return line 10 by means of a variable drain orifice Adrain.

As it is known in the art, when a steering wheel is turned, the main orifice A1 is opened and the drain orifice Adrain is closed. Hydraulic fluid entering the flow meter 12 moves parts of the flow meter 12 which in turn restore the orifices A1-A5 and Adrain to their initial condition.

An amplification flow path 14 having an amplification orifice AU is arranged parallel to a section of said main flow path 9, said section comprising the main orifice A1, the flow meter 12, and the two flow meter orifices A2, A3. The amplification orifice AU is controlled similarly to the main orifice A1, i.e. the amplification orifice AU opens together with the main orifice A1 and closes together with the main orifice A1. However, the instant opening of the amplification orifice AU is or can be proportional to the instant opening of the main orifice A1.

The pressure source 3 comprises a pump 15 and a dynamic priority valve 16. The pump 15 can be a fixed displacement pump driven via a shaft 17 by means of an engine or a motor of a vehicle to be steered, such engine being not shown in the FIGURE.

As it is known in the art, the priority valve 16 comprises a main output CF connected to the pressure port 4 of the steering unit 2 and a further output EF which can be connected to other hydraulic consumers having a lower priority than the steering unit 2.

The priority valve 16 comprises a spool 18 which is loaded by a spring 19 in a direction in which the main output CF has its maximum opening degree. The spring 19 is arranged in a spring chamber 20. The spring chamber 20 is connected to a load sensing port 21. The load sensing port 21 is connected to a load sensing line 22 which will be discussed later. On the opposite side to the spring 19, the piston 18 is loaded by a pressure in a pressure chamber 23.

The priority valve 16 comprises an input 24 which is connected to the pump 15. The pressure chamber 23 is connected to said input 24 by means of an orifice App. The spring chamber 20 is connected to this input 24 by means of an orifice Adyn. In the present example, both orifices App, Adyn are shown to be arranged within said piston 18. However, it is possible to use external lines to establish the connections between the input 24 and the pressure chamber 23 or the spring chamber 20, respectively.

The load sensing line 22 is connected to the tank 11. A load sensing orifice ALS is arranged within said load sensing line 22. The load sensing line 22 is connected to the tank 11 by means of an overpressure valve 30.

Furthermore, a control valve 25 is arranged within said load sensing lines 22 throttling the flow through said load sensing line 22. The degree of throttling is determined by a control pressure within said steering unit 2. In the present embodiment, this control pressure is the pressure at point 13, i.e. a pressure downstream said main orifice A1 and upstream said flow meter 12.

Furthermore, a safety valve 26 is arranged in said amplification flow path 14. Said safety valve 26 comprises a valve element 27 which is urged in a direction towards a valve 28 under the action of said control pressure, i.e. the pressure at point 13, and the action of a spring 29. The valve element 27 is loaded in the opposite direction by a pressure in the said amplification path 14.

A further bleed or orifice, which is not shown, can be arranged in parallel to the flow meter 12, i.e. such an orifice is connected to a point between the orifices A1 and A2 and to a point between the orifices A3 and A4. The purpose of such a variable orifice is to relieve a leakage occurring from the orifice AU or A4 to tank, when the steering unit 1 is in neutral position.

If only relieve from orifice AU is required, an alternative placing of such an orifice can be in a connection between a point downstream the orifice AU and tank.

The operation of the hydraulic steering arrangement 1 can be described as follows:

As long as the steering wheel is not actuated, said main orifice A1 and said amplification orifice AU are closed, whereas the drain orifice Adrain is open or at least partly open. Therefore, the pressure at point 13, i.e. the control pressure within said steering unit 2, corresponds basically to the pressure at the return port 5.

The piston 18 of the priority valve 16 is loaded by a pressure in said pressure chamber 23 corresponding to the pressure at the input 24 of the priority valve 16, since there is basically no flow out of said pressure chamber 23. The piston 18 is loaded in the other direction by the pressure in the spring chamber 20 and the force of the spring 19. The pressure in the spring chamber 20 is lower than the pressure in the pressure chamber 23 since there is a flow of hydraulic fluid from the input 24 through the orifice Adyn and the flow ALS to the tank 11. This flow is not throttled by the control valve 25 since the control pressure in the steering unit 2 corresponds to the pressure at the return port 5.

In this situation the pressure at the load sensing port 21 is determined by a pressure divider formed by the two orifices Adyn and ALS. The piston 28 is adjusted by the forces mentioned so that the main output CF and the further output EF are both supplied with hydraulic fluid from the pump 15. If of course other orifices (not shown) are arranged in the circuit, the pressure at the load sensing port is influenced by other means. However, the spring 19 plays a role here.

When the steering wheel is actuated, the main orifice A1 opens increasing the control pressure at point 13 of the steering unit 2. This pressure acts on the control valve 25 increasing the throttling resistance of the control valve 25 and therefore decreasing the flow of hydraulic fluid through the flow sensing line 22. Due to the reduced flow through said load sensing line 22 the pressure at the load sensing port 21 increases shifting the piston 18 in a direction in which the main output CF of the priority valve 16 is wider opened so that the steering unit is sufficiently supplied with hydraulic fluid.

The throttling behavior of the control valve 25 corresponds to the pressure level at point 13. The higher the control pressure at point 13 is, the higher is the throttling resistance of the control valve 25. It can be an advantage to use a control valve 25 having a control pressure/flow resistance function which corresponds to a behavior of the priority valve 16 being a function of the load sensing pressure and the output of the priority valve 16.

The control pressure at point 13 decreases since the steering motor 8 has been actuated to the desired extend and no further hydraulic fluid is necessary. Therefore, the main orifice A1 closes and the drain orifice Adrain opens with the effect that the control pressure at point 13 decreases as well. This decrease of control pressure opens the control valve 25 allowing a larger fluid flow through the load sensing line 22 which in turn lowers the pressure at the load sensing port 21 of the priority valve 16, or, more general, of the pressure source 3.

Under normal operating conditions, the safety valve 26 remains open since the pressure downstream the amplification orifice AU is larger than the control pressure downstream the main orifice A1, i.e. the control pressure at point 13 of the steering unit 2. Therefore, part of the hydraulic fluid from the pressure port 4 to the working port arrangement 6, 7 can pass through the amplification flow path 14.

However, when the main flow path 9 downstream the main orifice 1 is blocked, for example, when the flow meter 12 is jammed by dirt or the like, the control pressure at point 13 increases to become larger or at least equal to the pressure downstream the amplification orifice AU. In this situation, the force of spring 29 is sufficient to press the valve element 27 against valve seal 28 to interrupt a flow through the amplification flow path 14.

Since the same control pressure at point 13 can be used for actuating the control valve 25 and the safety valve 26, no additional pressure points have to be selected within the steering unit 2.

While the present invention has been illustrated and described with respect to a particular embodiment thereof, it should be appreciated by those of ordinary skill in the art that various modifications to this invention may be made without departing from the spirit and scope of the present.

What is claimed is:

1. A hydraulic steering arrangement comprising:
    a steering unit including a pressure port;
    an adjustable pressure source connected to the pressure port of said steering unit, the adjustable pressure source including a load sensing port;
    wherein said pressure source is a dynamic pressure source having an orifice outputting hydraulic fluid to said load sensing port;
    a load sensing line connecting said load sensing port and a low pressure port; and
    a control valve arranged in said load sensing line between said load sensing port and said low pressure port, said control valve being actuated by a control pressure within said steering unit and throttling a flow through said load sensing line depending on said control pressure,
    wherein said steering unit comprises:
        a supply port arrangement having a pressure port and a return port;
        a working port arrangement having two working ports;
        a main flow path between said pressure port and said working port arrangement;
        a return flow path between said working port arrangement and said return port; and
        a main orifice and a flow meter arranged in said main flow path;
        wherein said main orifice opens upon actuation of a wheel;
        wherein said control pressure is a pressure downstream said main orifice; and
        wherein said control pressure is a pressure between said main orifice and said flow meter.

2. The steering arrangement according to claim 1, wherein said pressure source comprises a dynamic priority valve.

3. The steering arrangement according to claim 1, wherein an amplification flow path is arranged in parallel to a section of said main flow path, said section comprising said main orifice and said flow meter.

4. The steering arrangement according to claim 3, wherein a safety valve is arranged in said amplification flow path, said safety valve being loaded in closing direction by said control pressure.

5. The steering arrangement according to claim 2, wherein an amplification flow path is arranged in parallel to a section of said main flow path, said section comprising said main orifice and said flow meter.

6. A hydraulic steering arrangement comprising:
    a steering unit including a pressure port;
    an adjustable pressure source connected to the pressure port of said steering unit, the adjustable pressure source including a load sensing port;
    wherein said pressure source is a dynamic pressure source having an orifice outputting hydraulic fluid to said load sensing port;
    a load sensing line connecting said load sensing port and a low pressure port; and
    a control valve arranged in said load sensing line between said load sensing port and said low pressure port, said control valve being actuated by a control pressure within said steering unit and throttling a flow through said load sensing line depending on said control pressure;
    wherein said pressure source comprises a dynamic priority valve.

7. The steering arrangement according to claim 6, wherein said steering unit comprises:
    a supply port arrangement having a pressure port and a return port;
    a working port arrangement having two working ports;
    a main flow path between said pressure port and said working port arrangement;
    a return flow path between said working port arrangement and said return port; and
    a main orifice and a flow meter arranged in said main flow path;
    wherein said main orifice opens upon actuation of a steering wheel; and
    wherein said control pressure is a pressure downstream said main orifice.

8. The steering arrangement according to claim 7, wherein said control pressure is a pressure between said main orifice and said flow meter.

9. The steering arrangement according to claim 7, wherein an amplification flow path is arranged in parallel to a section of said main flow path, said section comprising said main orifice and said flow meter.

10. The steering arrangement according to claim 6, wherein an amplification flow path is arranged in parallel to a section of said main flow path, said section comprising said main orifice and said flow meter.

11. The steering arrangement according to claim 10, wherein a safety valve is arranged in said amplification flow path, said safety valve being loaded in closing direction by said control pressure.

12. A hydraulic steering arrangement comprising:
a steering unit including a pressure port;
an adjustable pressure source connected to the pressure port of said steering unit, the adjustable pressure source including a load sensing port;
wherein said pressure source is a dynamic pressure source having an orifice outputting hydraulic fluid to said load sensing port;
a load sensing line connecting said load sensing port and a low pressure port; and
a control valve arranged in said load sensing line between said load sensing port and said low pressure port, said control valve being actuated by a control pressure within said steering unit and throttling a flow through said load sensing line depending on said control pressure;
wherein an amplification flow path is arranged in parallel to a section of said main flow path, said section comprising said main orifice and said flow meter; and
wherein a safety valve is arranged in said amplification flow path, said safety valve being loaded in closing direction by said control pressure.

13. The steering arrangement according to claim 12, wherein said steering unit comprises:
a supply port arrangement having a pressure port and a return port;
a working port arrangement having two working ports;
a main flow path between said pressure port and said working port arrangement;
a return flow path between said working port arrangement and said return port; and
a main orifice and a flow meter arranged in said main flow path;
wherein said main orifice opens upon actuation of a steering wheel; and
wherein said control pressure is a pressure downstream said main orifice.

14. The steering arrangement according to claim 13, wherein said control pressure is a pressure between said main orifice and said flow meter.

15. The steering arrangement according to claim 13, wherein said pressure source comprises a dynamic priority valve.

16. The steering arrangement according to claim 13, wherein said control pressure is a pressure between said main orifice and said flow meter; and
wherein said pressure source comprises a dynamic priority valve.

17. The steering arrangement according to claim 12, wherein said pressure source comprises a dynamic priority valve.

* * * * *

UNITED STATES PATENT AND TRADEMARK OFFICE
CERTIFICATE OF CORRECTION

PATENT NO. : 9,550,521 B2
APPLICATION NO. : 14/203615
DATED : January 24, 2017
INVENTOR(S) : Rene Andersen et al.

It is certified that error appears in the above-identified patent and that said Letters Patent is hereby corrected as shown below:

In the Claims

In Column 6, Claim 1, Line 16 please insert --steering-- before the word "wheel."

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*